United States Patent
Chkodrov et al.

(10) Patent No.: US 10,698,873 B2
(45) Date of Patent: Jun. 30, 2020

(54) PERFORMANCE DATA STORAGE

(71) Applicant: Microsoft Technology Licensing, LLC, Redmond, WA (US)

(72) Inventors: Gueorgui B. Chkodrov, Redmond, WA (US); Jose Wilson Morris, Bothell, WA (US); Kevin M. Grady, Sammamish, WA (US); Jonathan P. Morris, Duvall, WA (US); Yuesu Liu, Renton, WA (US); Douglas M. Setser, Sammamish, WA (US); David St. Pierre, Angel Fire, NM (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 444 days.

(21) Appl. No.: 15/474,784

(22) Filed: Mar. 30, 2017

(65) Prior Publication Data
US 2018/0285396 A1    Oct. 4, 2018

(51) Int. Cl.
*G06F 16/00* (2019.01)
*G06F 16/22* (2019.01)
*G06F 16/16* (2019.01)
*G06F 16/21* (2019.01)
*G06F 16/25* (2019.01)

(52) U.S. Cl.
CPC ........ *G06F 16/2228* (2019.01); *G06F 16/164* (2019.01); *G06F 16/211* (2019.01); *G06F 16/258* (2019.01)

(58) Field of Classification Search
CPC .. G06F 16/2228; G06F 16/164; G06F 16/211; G06F 16/258

USPC ........................................................ 707/741
See application file for complete search history.

(56) References Cited

U.S. PATENT DOCUMENTS

| | | | |
|---|---|---|---|
| 6,615,261 B1 | 9/2003 | Smørgrav | |
| 7,526,757 B2 | 4/2009 | Levine et al. | |
| 8,949,285 B2 | 2/2015 | Kumar | |
| 9,075,788 B1* | 7/2015 | Roth | G06F 11/3006 |
| 9,210,053 B2 | 12/2015 | Chen et al. | |
| 9,298,651 B2 | 3/2016 | Heyrman et al. | |
| 9,613,068 B2* | 4/2017 | Tsirogiannis | G06F 16/211 |
| 9,836,494 B2* | 12/2017 | Caudy | G06F 8/427 |
| 10,346,394 B2* | 7/2019 | Caudy | G06F 16/2308 |
| 2004/0054680 A1* | 3/2004 | Kelley | H04L 41/046 |
| 2012/0239612 A1* | 9/2012 | George | G06F 16/254 707/602 |

(Continued)

OTHER PUBLICATIONS

Loboz, et al., "DataGarage: Warehousing Massive Performance Data on Commodity Servers", In Proceedings of the VLDB Endowment, vol. 3, Issue, Sep. 2010, 12 pages.

(Continued)

*Primary Examiner* — Hanh B Thai
(74) *Attorney, Agent, or Firm* — Mannava & Kang, P.C.

(57) ABSTRACT

Performance data generated according to a first schema is read. From the first schema, object descriptors having common primitive types are identified. A second schema is then created. The second schema defines a plurality of rows and at least one column. The rows include a record corresponding to an identified object descriptor. The at least one column corresponds to a primitive type in common with the identified object descriptors.

20 Claims, 12 Drawing Sheets

(56) References Cited

U.S. PATENT DOCUMENTS

| | | | |
|---|---|---|---|
| 2013/0080736 A1* | 3/2013 | Meirowitz | G06F 9/45516 711/208 |
| 2014/0053155 A1 | 2/2014 | Cota-Robles et al. | |
| 2014/0165048 A1* | 6/2014 | Meirowitz | G06F 9/45516 717/153 |
| 2014/0279838 A1* | 9/2014 | Tsirogiannis | G06F 16/211 707/603 |
| 2015/0227562 A1* | 8/2015 | Takahashi | G06F 16/2228 707/803 |
| 2015/0312356 A1* | 10/2015 | Roth | G06F 11/3006 709/226 |
| 2015/0356094 A1* | 12/2015 | Gorelik | G06F 16/16 707/748 |
| 2016/0042015 A1 | 2/2016 | Landau et al. | |
| 2016/0103862 A1* | 4/2016 | Boe | G06F 16/2228 707/744 |
| 2016/0139808 A1 | 5/2016 | Stevens, Jr. et al. | |
| 2016/0179853 A1* | 6/2016 | Bertin | G06F 16/113 707/662 |
| 2016/0266881 A1* | 9/2016 | Thompson | G06F 8/60 |
| 2016/0350323 A1* | 12/2016 | Suvorov | G06F 16/164 |

OTHER PUBLICATIONS

Hall, Jason, "Mining Performance Data from SQL Sentry : Part 6", https://blogs.sentryone.com/jasonhall/mining-performance-data-6/, Published on: Mar. 2, 2015, 6 pages.

JR, Rob Boucher, "Create and use performance counters in an Azure application", https://docs.microsoft.com/en-us/azure/cloud-services/cloud-services-dotnet-diagnotics-performance-counters, Published on: Feb. 29, 2016, 13 pages.

"Manual Chapter: Health and Performance Monitoring Database Schema", https://support.f5.com/kb/en-us/products/em/manuals/product/em-health-monitoring-3-0-0/11.html, Retrieved on Nov. 28, 2016, 7 pages.

* cited by examiner

PERFORMANCE DATA STORAGE

BACKGROUND

Performance data for network devices such as, for example, counters and link/interface state data, are typically used to monitor various parameters of hardware and software systems. Counter data is collected and analyzed to evaluate performance of systems and, possibly, identify scope for their improvement. In addition, link/interface state data provides information regarding the operational health of a device. Some example systems that provide counter and link/interface data include, software applications, virtual machines, physical machines, and operating systems.

Performance data is stored in databases and analytic tools may be used to explore and derive insights from stored data. A schema is designed for storing the performance data. One of skill in the art will appreciate that the operational cost and performance characteristics of a data storage system depends on the choice of schema. For instance, a schema used to store the counter data includes several columns such as, for example, a time stamp column, a device key column, a device address column, an interface column, a counter type column, and a counter value column. As the counter data is collected and stored, several rows of data are generated. For example, if there are ten counter types, ten interfaces, and ten thousand devices, then a total of one million rows of data are generated for a single sampling interval. If a sample is collected every minute, then about one and a half billion rows are generated per day. Storing such a large amount of data may cause performance degradation problems for the underlying data storage system. For example, storing large amounts of data may increase query response times, may increase storage costs, and may even compromise the integrity of the data stored.

BRIEF DESCRIPTION OF THE DRAWINGS

Example embodiments are described in detail in the following description with reference to the following figures. The example embodiments are illustrated in the accompanying figures in which like reference numerals indicate similar elements.

DETAILED DESCRIPTION

Figure 1:
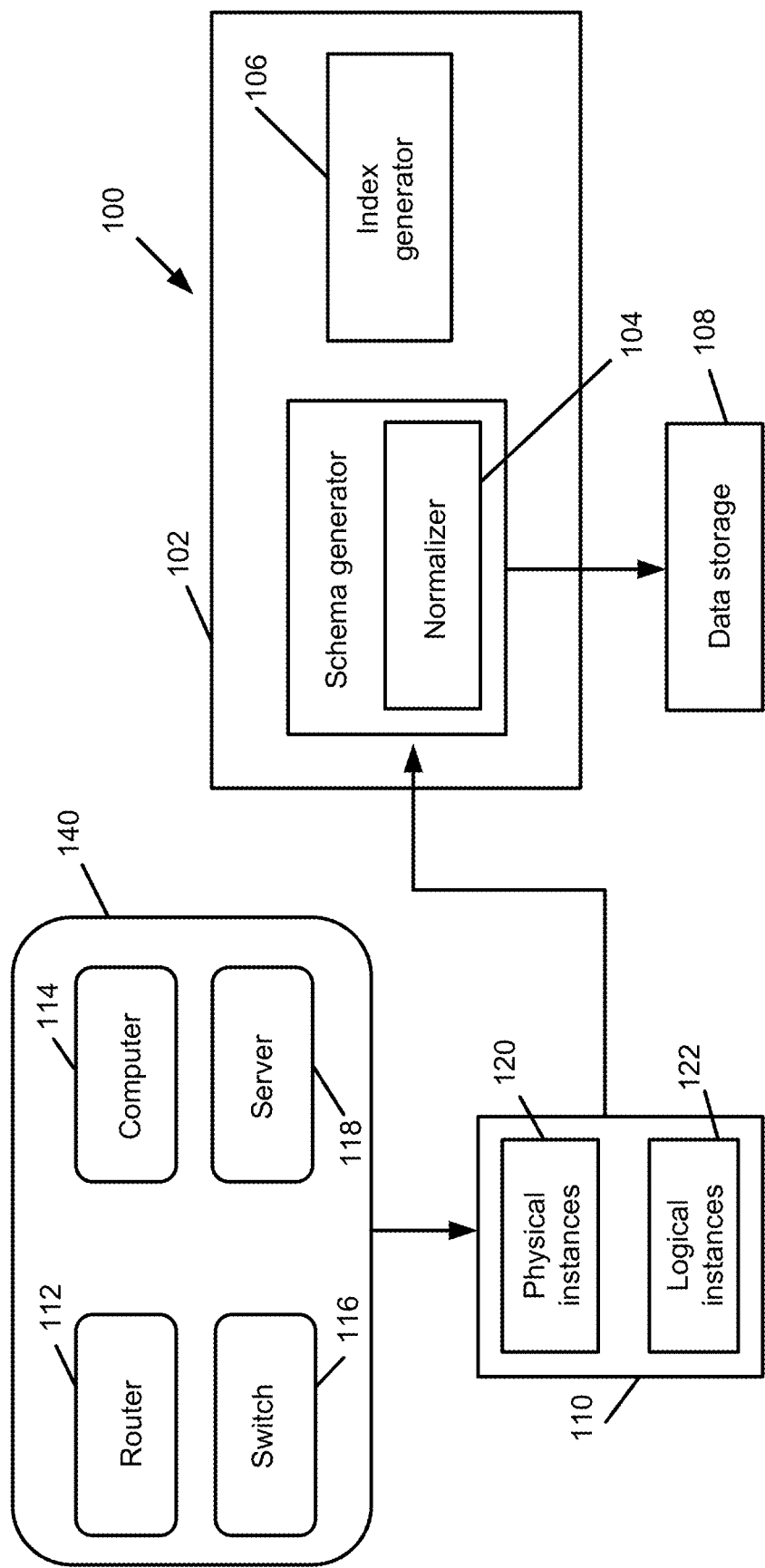
FIG. 1 illustrates a system for managing performance data according to an example embodiment.

For simplicity and illustrative purposes, the present disclosure is described by referring to example embodiments. In the following description, numerous specific details are set forth in order to provide an understanding of the example embodiments. However, it will be apparent to one of ordinary skill in the art, that the example embodiments may be practiced without limitation to these specific details. In some instances, well known methods and/or structures have not been described in detail so as not to unnecessarily obscure the description. Furthermore, the example embodiments may be used together in various combinations. In addition, the use of "a" or "an" before any element in the present disclosure and claims refers to at least one of that element.

According to examples of the present disclosure, performance data of software or hardware systems based on a first schema is read, object descriptors having one or more common primitive types are identified, and a second schema is created to define at least one column corresponding to a primitive type in common with the identified object descriptors. The second schema also defines rows to include records corresponding to the identified object descriptors. Consistent with the present disclosure, in a first schema a primitive type such as a counter name is represented as a character string, whereas in the corresponding second schema the primitive type is a column name.

The first schema includes fields for a time stamp, an instance identifier, an object descriptor, a primitive type, and a primitive value. The instance identifier may be a physical instance identifier or a logical instance identifier. A physical instance identifier may identify a physical device such as, for example, a router, a switch, a hub, a modem, a server, a personal computer, or a laptop. A logical instance identifier may identify a logical construct such as, for example, a logical router instance, a database instance, a Virtual LAN ("VLAN"), a Virtual Channel ("VC"), a Virtual Path ("VP") a Multiprotocol Label Switch instance ("MPLS"), or an Autonomous System instance. An object descriptor may describe performance data associated with the instances. The performance data may include, for example, interface data, central processing unit (CPU) data, Link State Path (LSP) data, Virtual Local Area Network (VLAN) data, Virtual Channel (VC) data, or Virtual Path (VP) data.

Various types of data may be used to monitor performance of hardware and/or software systems. Examples of such data include counters, link state data, and the like. More specific examples of counter data include counters for CPU usage, disk operation, packet data and hitting exceptions. A primitive type may be defined for a type of monitored data and associated primitive values are collected for that monitoring parameter. As an example, a primitive type may be counter data wherein the primitive value is the actual counter value in the form of integers. As another example, the primitive type may be link state data, wherein the primitive value may be in form of string data such as "up"/"down" or "administratively shut" or in the form of special character data such as an up arrow (↑) or a down arrow (↓).

Based on the second schema, values of the object identifiers and primitive values for one or more primitive types common to the object identifiers are collected in a table. The collected data is stored in a database and queried. Compared to data generated based on the first schema, data generated based on the second schema has a reduced number of rows.

The number of rows and columns, the memory, and overall data footprint may be several times lesser compared to data generated by standard schemas such as the first schema. This may lead to a lower memory requirement to store such data.

According to an example embodiment, normalization techniques may also be used to further reduce data footprint. Specifically, instance identifiers and object descriptors may be normalized by creating a metadata identifier, if data in their respective fields does not change over a plurality of polling intervals. Furthermore, the object descriptors in the second schema are replaced with the corresponding metadata identifiers.

According to an example embodiment, an index may be created to increase query performance. In particular, an index corresponding to an instance is created for data generated by the second schema. The primitive values however are excluded for creating the index.

FIG. 1 illustrates an example embodiment of a system 100 for managing performance data obtained from a computer network 140. System 100 includes a schema generator 102, a normalizer 104, and an index generator 106. Computer network 140 may include a number of computing devices. These include router 112, computer 114, switch 116, and server 118. Each of the computing devices may include a physical instance 120 and/or a logical instance 122. Furthermore, each device may provide performance data 110 indicative of the performance of the device. Schema generator 102 may read performance data 110 to generate a second schema in accordance with the present disclosure. Data stored in accordance with the second schema generated by schema generator 102 may be stored in data storage 108. Data storage 108 may be any tabular form of data storage such as, for example, a relational database, that can store data in accordance with the second schema. In an example embodiment, schema generator 102 reads performance data 110 generated from a first schema. Performance data 110 is received and stored according to the first schema. Performance data 110 includes instance identifiers, e.g., physical device identifiers or logical instance identifiers. For example, performance data 110 for server 118 may include data from a physical instance 120 such as, for example, the hardware of server 118 or a logical instance such as, for example, a software application running on server 118.

Figure 2A:
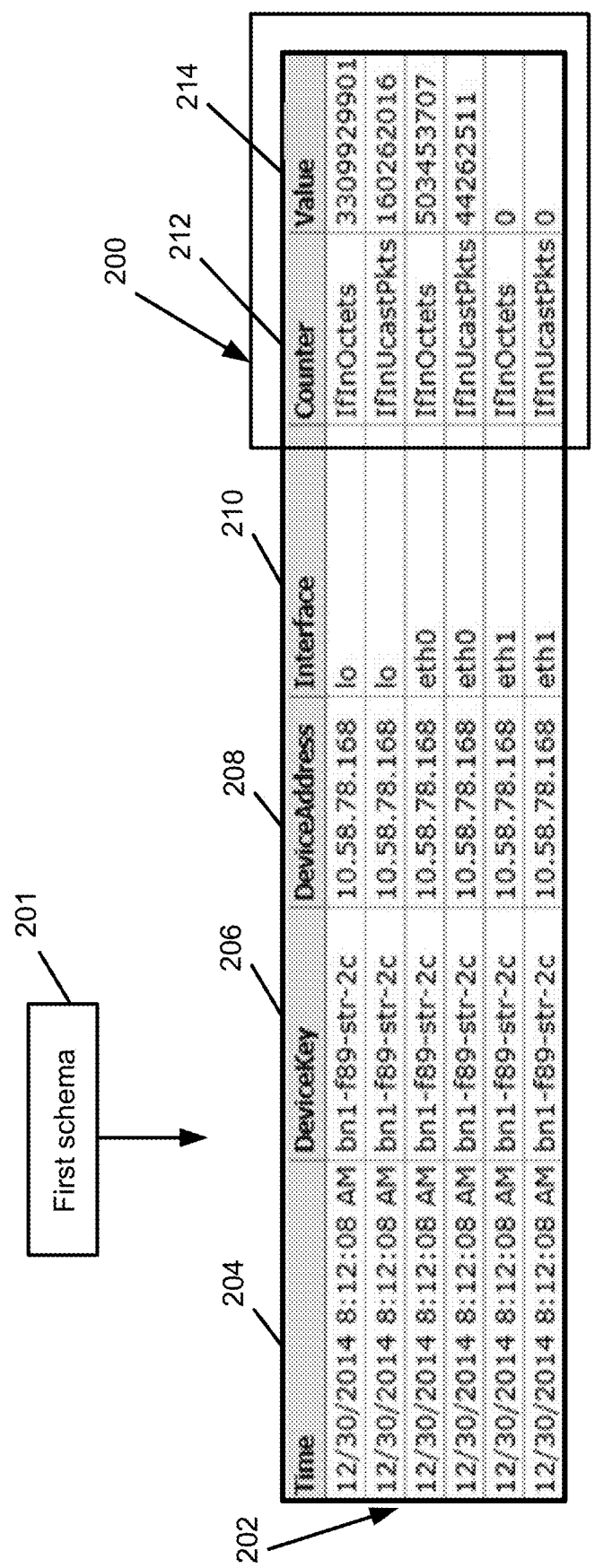
FIG. 2A illustrates performance data according to a first schema according to an example embodiment.

FIG. 2A illustrates an example of performance data 200 stored in accordance with first schema 201. In an example embodiment, first schema 201 used to store this data may be a "name-value" schema. Data 200 may include a plurality of rows 202, a time stamp column 204, an instance identifier column 206, a device address column 208, an object descriptor column 210, a primitive type column 212, and a primitive value column 214. Time stamp column 204 includes time values that indicate when the counter values are collected. The instance identifier column 206 may include device keys. A device key may be a series of alphanumeric characters assigned to a device such as, for example, a router. In this example, all the rows correspond to a single device key. The device address column 208 includes an IP address of the device. The object descriptor column 210 includes interface identifiers. In this example, the interface identifiers "Io," "eth0," and "eth1" may be names for the corresponding interfaces on the computing device that provided the performance data. Referring back to FIG. 1, the computing device may be router 112, computer 114, switch 116, or server 118.

The primitive type column 212 may include counter types. In an example embodiment, "IfInOctets" is one counter type and "IfInUcastPkts" is another counter type. The primitive value column 214 includes counter values for the corresponding counter types. In case of network devices, counter data may be sampled using a push protocol or a pull protocol. In push protocol, counters are sampled on local timer on the device and then the values are sent as a one-way stream. An example of push protocol is "SFLOW." In pull protocol, the device responds to requests from a remote management station, which has a list of counters that are of interest. Counter values are sent in response to such requests. An example of pull protocol is Simple Network Management Protocol (SNMP). One of ordinary skill in the art will appreciate that the communication protocols described above are examples only and that other such protocols may be used to communicate data between the computing devices and the schema generator without departing from the scope of this disclosure.

Data 200 thus stored in accordance with the first schema 201 can be very large in size. For example, if there are ten counter types, ten interfaces, and ten thousand devices, then a total of one million rows are generated just for one sampling interval. If the sampling interval is one minute, then over a period of twenty-four hours, more than a billion rows of data are generated. Data thus stored can soon reach to the order of terabytes. Any analysis on such data requires querying. But with such vast amounts of data, query response time may be adversely affected and computing performance may be degraded.

Referring back to FIG. 1, the schema generator 102 reads performance data 110 generated from the first schema. The schema generator 102 identifies object descriptors such as, for example, interface identifiers, that have one or more common primitive types such as, for example, counter types. For example, there may be several rows in the data stored by the first schema in which interface identifiers (e.g., "Io" and "eth0") have a common counter type "IfInOctets" (as shown in FIG. 2A). Schema generator 102 identifies such interface identifiers. The schema generator 102 then creates a second schema. The second schema defines a column corresponding to the common primitive type and a plurality of rows, where each row includes a record for an identified object descriptor. In an example embodiment, the identified object descriptors would be interface identifiers "Io" and "eth0" and the common primitive type would be the counter type "IfInOctets".

Figure 3A:
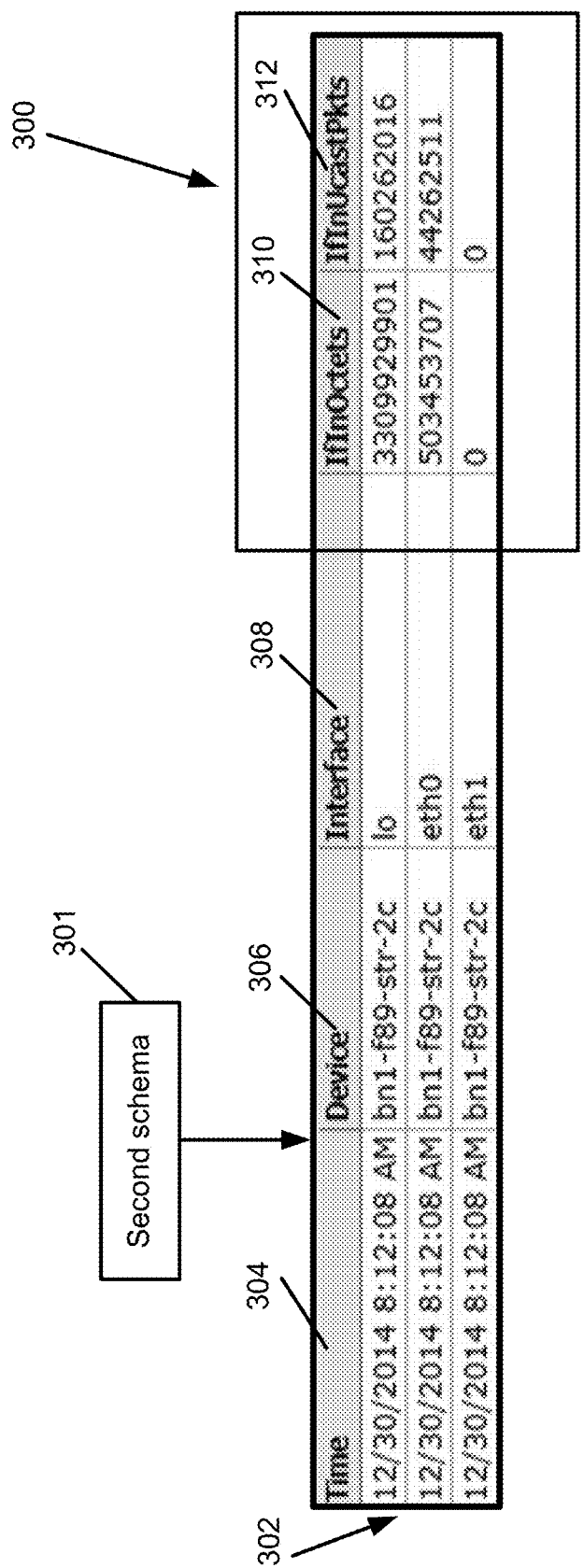
FIG. 3A illustrates data stored according to a second schema according to an example embodiment.

FIG. 3A illustrates an example of data 300 stored in accordance with the second schema 301. One of ordinary skill in the art will appreciate that while FIG. 3A illustrates data 300 stored in accordance with the second schema 301, the second schema 301 itself is the column names shown in FIG. 3A. The data 300 includes a plurality of rows 302 as per the second schema 301, a time stamp column 304, an instance identifier column 306, an object descriptor column 308, a first primitive type column 310, and a second primitive column 312. In one example, data 300 is collected from physical and/or logical instances in a network at predetermined polling or sampling intervals. A pull or push protocol may be used to collect data. The time stamp column 304 includes time values that indicate when the counter values are collected. The instance identifier column 306 includes device keys. The device keys may represent a physical instance of the device such as, for example, a router. A device key may be a series of alphanumeric characters assigned to the device. The object descriptor column 308 includes interface identifiers, namely, "Io," "eth0," and "eth1." The first primitive type column 310 is for "IfInOctets" counter type and the second primitive column 312 is for "IfInUcastPkts" counter type. In addition, the first primitive type column 310 and the second primitive column 312 include respective counter values.

Each row corresponds to data of an object descriptor taken at a moment in time. For example, the first row corresponds to "Io" interface identifier, the second row corresponds to "eth0" interface identifier, and the third row corresponds to "eth1" interface identifier. One of ordinary skill in the art will that the number of rows has been reduced compared to data generated based on the first schema. Repetitive object descriptor rows are consolidated and now each row corresponds to snapshot of one object descriptor at a moment in time. One of ordinary skill in the art will appreciate that the primitive values, e.g., counter values, of corresponding primitive types such as "IfInOctets" and "IfInUcastPkts" will change from one polling interval to another. By adding new columns for primitive types, the number of rows is reduced. An assumption for generating the second schema 301 is that the primitive types for a given source of data do not change very often.

Figure 2B:
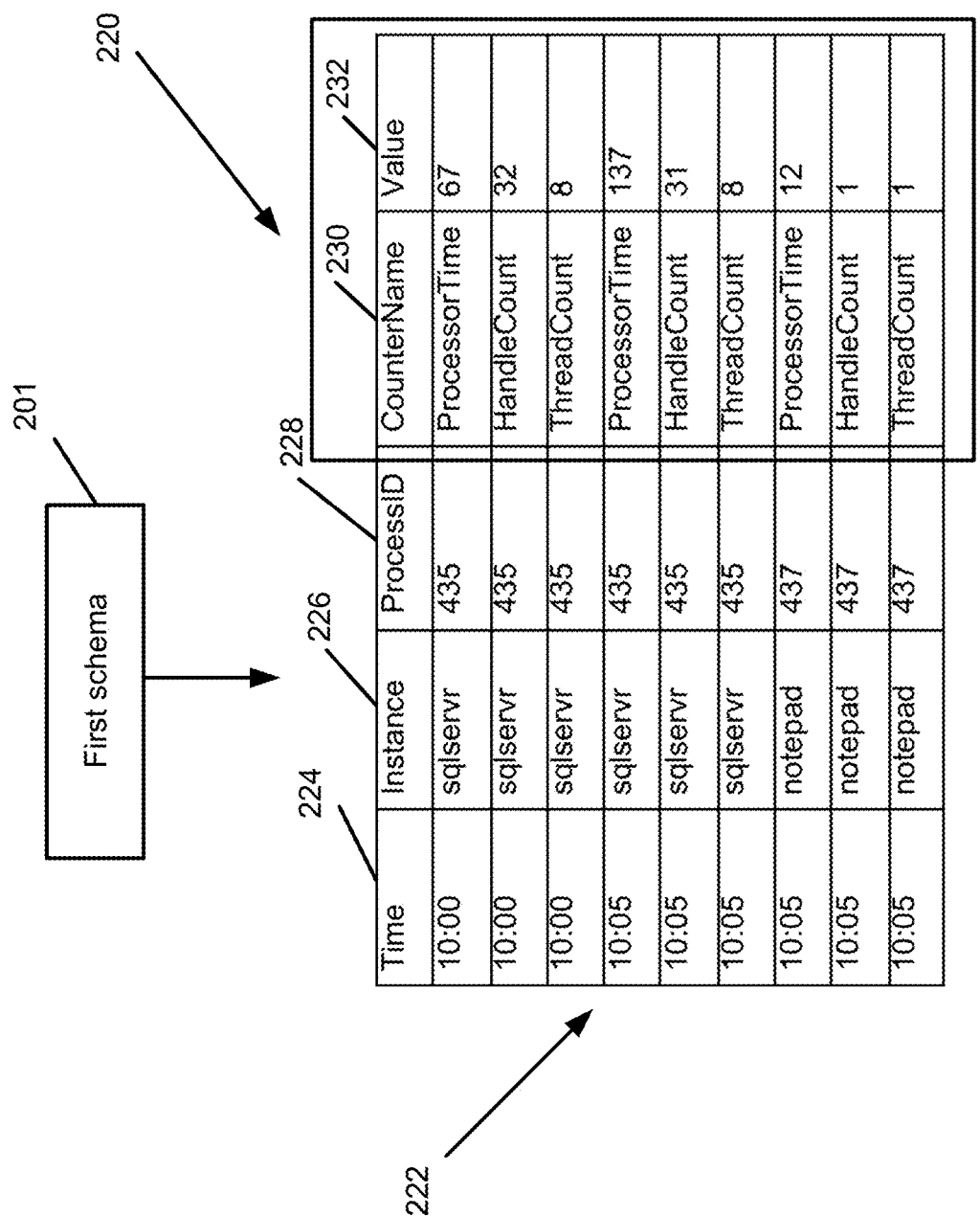
FIG. 2B illustrates performance data stored according to a first schema according to an example embodiment.

FIG. 2B illustrates another example of performance data 220 stored in accordance with first schema 201. Like schema 201 depicted in FIG. 2A, data 220 may include a plurality of rows 222, a time column 224, an instance identifier column 226, an object descriptor column 228, a primitive type column 230, and a primitive value column 232. Time stamp column 224 includes time values that indicate when the counter values are collected. The instance identifier column 206 may include software applications running on a computing device such as an SQL server or notepad. The object descriptor column 228 includes process ids. In an example embodiment, a software application running on the computing device may have a corresponding process id. As shown in FIG. 2B, the "sqlserver" application has a process id of 435, whereas the "notepad" application has a process id of 437.

The primitive type column 230 in an example embodiment may include different counter types identified by the counter names. As shown in FIG. 2B, the different counter types include "Processor Time", "Handle Count" and "Thread Count". One of ordinary skill in the art will appreciate that other counter types may also be stored in accordance with the schema depicted in FIG. 2B without departing from the scope of the present disclosure. In addition, the primitive value column 232 stores the corresponding counter values for each counter type. Referring back to FIG. 1, the computing device may be router 112, computer 114, switch 116, or server 118.

Figure 3B:
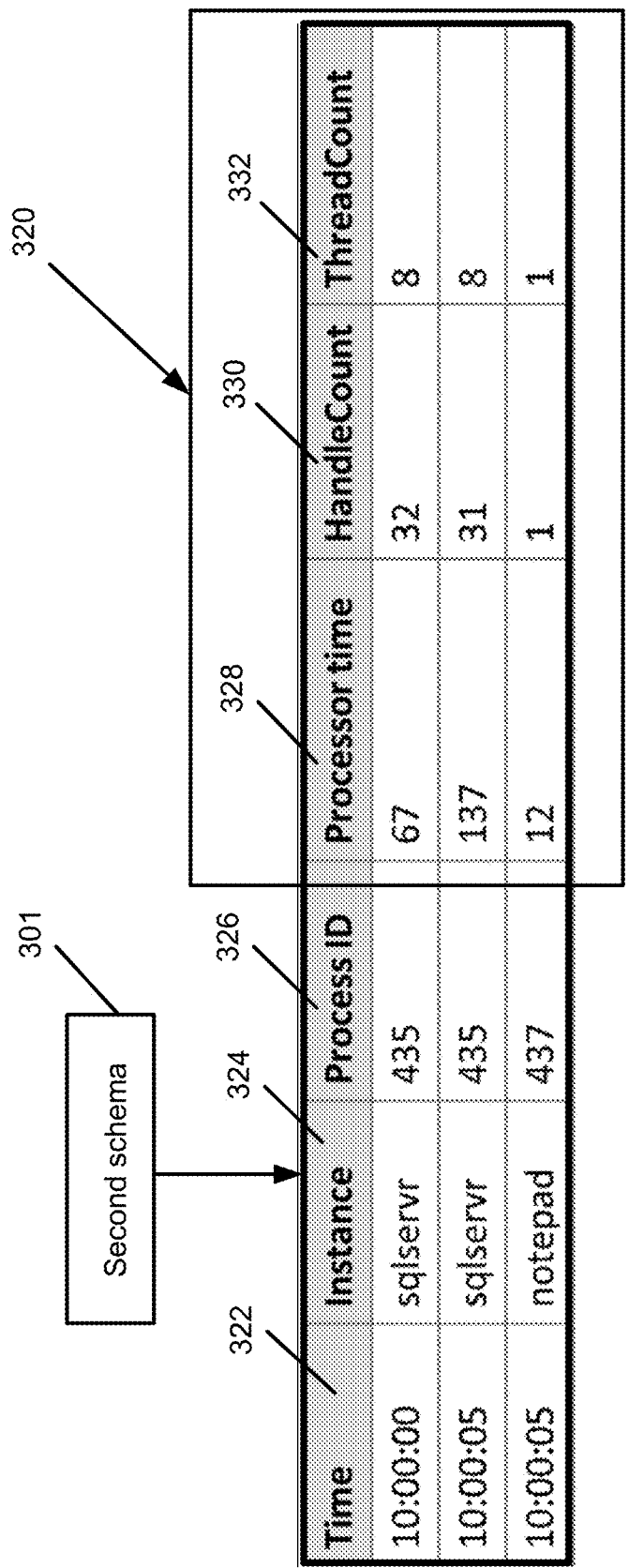
FIG. 3B illustrates data stored according to a second schema according to an example embodiment.

FIG. 3B illustrates an example embodiment of second schema 301. Second schema 301 in FIG. 3B is transformed from first schema 201 in FIG. 2B according to principles consistent with the present disclosure. As shown in FIG. 3B second schema 301 stores data 320. This example is pertains to the computer processor related data shown in FIG. 2B. Time stamp column 322 includes time values that indicate when the counter values are collected. Instance identifier column 324 includes the logical instances, namely, "sqlserver" and "notepad." Object descriptor column 326 includes process identifiers. First primitive type column 328 is for "Processor time" counter, the second primitive type column 330 is for "HandleCount" counter and the third primitive type column 332 is for "ThreadCount" counter.

In an example embodiment, primitive types "Processor time", "Handle Count", and "Thread Count" are common to object descriptor "process identifier". Therefore in accordance with the present disclosure, second schema 301 stores data in the format show in FIG. 3B, where the common primitive types are stored as column data. One of ordinary skill in the art will appreciate that data stored as illustrated in FIG. 3B may reduce the amount memory required for computer processor performance data. One of ordinary skill in the art will also appreciate that storing data as shown may also reduce the complexity of querying data stored in this format.

Figure 2C:
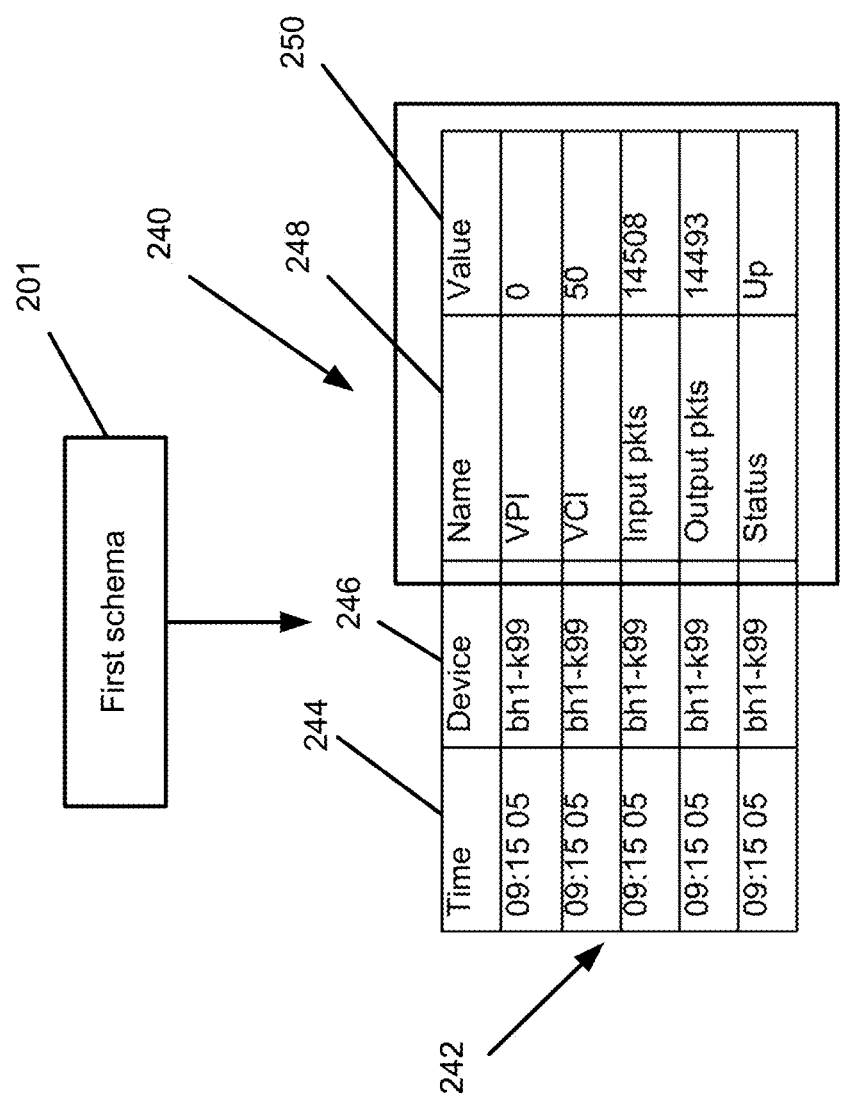
FIG. 2C illustrates performance data stored according to a first schema according to an example embodiment

FIG. 2C illustrates another example of performance data 240 stored in accordance with first schema 201. This example is related to Virtual Path (VP) and Virtual Channel (VC) data on a computing device. One of ordinary skill in the art will appreciate that a Virtual Channel is part of a Virtual Path. Furthermore, a Virtual Path may include multiple Virtual Channels. Like schema 201 depicted in FIG. 2A, data 240 may include a plurality of rows 242, a time column 224, an instance identifier column 246, a primitive type column 248, and a primitive value column 232. Time stamp column 244 includes time values that indicate when the counter values are collected. The instance identifier column 246 may include device keys. A device key may be a series of alphanumeric characters assigned to a device such as, for example, a router.

In this example, all the rows correspond to a single device key. The primitive type column 248 includes Virtual Path Identifier (VPI) information, Virtual Channel Identifier (VCI) information, the number of packets input into each VCI, the number of packets output from each VCI and the status of the VCI. As shown in FIG. 2C, at a particular moment in time, i.e., 09:15 05, a device with device identifier bh1-k99 has received 14508 packets on VC 50 which is part of Virtual Path 0. Furthermore, VC 50 has output 14493 packets at that time. Furthermore, VC 50 is in "up" status. Referring back to FIG. 1, the computing device may be router 112, an ATM (Asynchronous Transfer Mode) switch, a Frame Relay switch, or any other device that supports Virtual Channels and Virtual Paths.

Figure 3C:
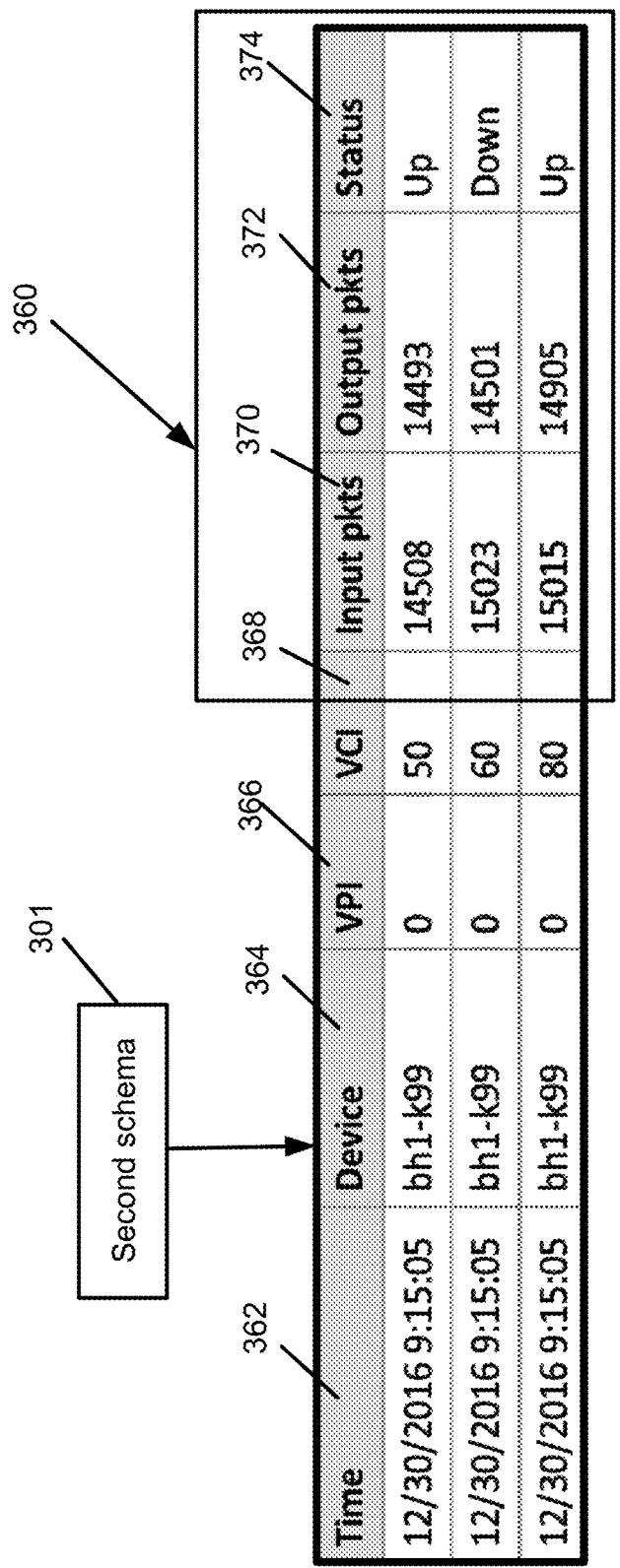
FIG. 3C illustrates data stored according to a second schema according to an example embodiment.

FIG. 3C illustrates an example embodiment of second schema 301. Second schema 301 in FIG. 3C is derived from first schema 201 in FIG. 2C according to principles consistent with the present disclosure. As shown in FIG. 3C second schema 301 stores data 360. As discussed with respect to FIG. 2C, this example is related to Virtual Path (VP) and Virtual Channel (VC) data. The time stamp column 362 may include time values that indicate when the primitive type values are collected. The instance identifier column 364 includes device keys. The first object descriptor column 366 includes Virtual Path Identifier ("VPI") data. The second object descriptor column 368 includes Virtual Channel Identifier ("VCI") data. The first primitive type column 370 is for "Input pkts" primitive type, the second primitive type column 372 is for "Output pkts" primitive type, and the third primitive type column 374 is for "Status" primitive type. One of ordinary skill in the art will appreciate that the primitive types "Input pkts", and "Output pkts" have primitive values stored as integers, whereas the primitive type "Status" has primitive values stored as string characters. It will also be apparent to one of ordinary skill in the art that certain data stored as a primitive type in the first schema may be stored as an object descriptor in the second schema without departing from the scope of the disclosure. For example, in FIG. 2C, VPI and VCI data was stored as a primitive type, whereas the same information is stored as object descriptors in FIG. 3C.

In an example embodiment, primitive types "Input pkts", "Output pkts", and "Status" are common to object descriptors "Virtual Path Indicator" and "Virtual Channel Indicator". Therefore in accordance with the present disclosure, second schema 301 stores data in the format show in FIG.

3C, where the common primitive types are stored as column data. Second schema 301 in FIG. 3C may include additional rows storing performance data 360 for other VCs on the same computing device as shown. Although corresponding information in first schema 201 is not illustrated for these rows in FIG. 2C, one of skill in the art will appreciate that the techniques used to store such data are the same as the ones discussed above.

One of ordinary skill in the art will appreciate that data stored as illustrated in FIG. 3D may reduce the amount memory required for computer processor performance data. One of ordinary skill in the art will also appreciate that storing data as shown may also reduce the complexity of querying data stored in this format.

Referring back to FIG. 1, in an example embodiment, schema generator 102 includes normalizer 104. Normalizer 104 normalizes the instance identifiers and the object descriptors by creating corresponding metadata identifiers. The problem of repetitive instance identifiers and object descriptors is therefore addressed, thereby resulting in a further reduction of size of the table generated by the second schema.

Figure 4:
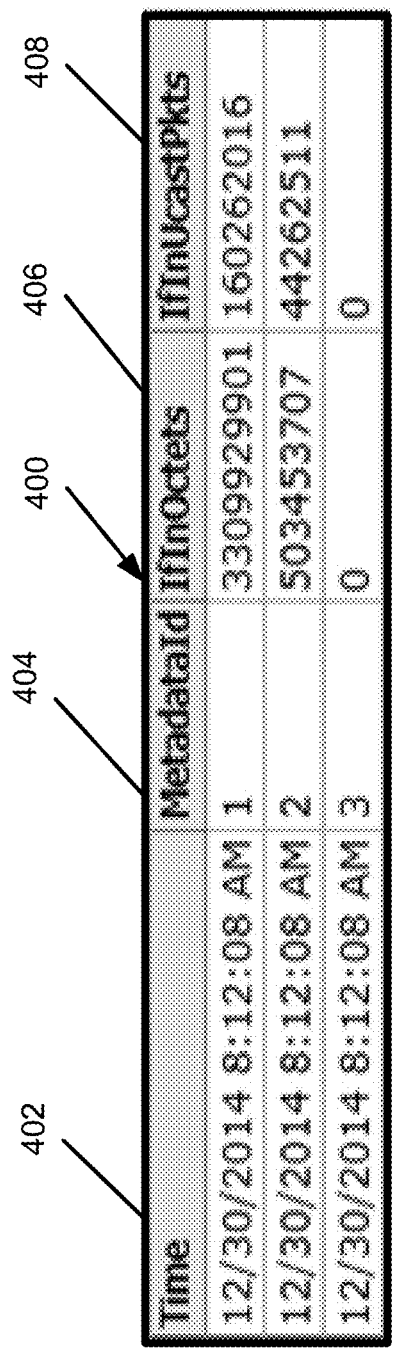
FIG. 4 illustrates data stored according to a second schema after applying normalization according to an example embodiment.

FIG. 4 illustrates an example of data 400 stored in accordance with the second schema after applying normalization. Instance identifier—object descriptor pairs are identified. Furthermore, the identified instance identifiers and object descriptors are normalized by creating corresponding metadata identifiers and a metadata table is created. For example, for the instance identifier "bn1-f89-str-2c" and for the object descriptor "Io" (see also FIG. 3A), a metadata identifier "1" is created. Similarly, a metadata identifier "2" is created for the instance identifier "bn1-f89-str-2c", for the object descriptor "eth0", and a metadata identifier "3" is created for the instance identifier "bn1-f89-str-2c" and for the object descriptor "eth1." The instance identifiers and object descriptors are replaced with the metadata identifiers. Additionally, the instance identifier column and object descriptor column are replaced with a metadata identifier column. Therefore, the data 400 after normalization includes a time stamp column 402, a metadata identifier column 404, a first primitive type column 406, and a second primitive column 408. One of ordinary skill in the art will appreciate that the amount of data 400 is further reduced after normalization. Such reduction in data may improve query response time and may also reduce storage costs. For example, over ten times reduction in data may be achieved for a sample of experimental data. Additional data savings may be achieved depending on the sample data, sample interval, technical environment, and other such parameters.

Referring back to FIG. 1, in an example embodiment, the index generator 106 creates an index for data generated by the second schema. The index is created once and includes the columns that make up the object descriptor. For example in FIG. 3A the index will be on {Time, Device, Interface}. The primitive values corresponding to each primitive type are not used in creating the index. The created index may be used to quickly and efficiently find the set of rows for a given object identifier and time range.

In order to further increase query response time, the repetitive strings that compose an object identifier may be stored in a separate "metadata" table. For example, referring back to FIG. 4, an index may be created on columns 402 and 404. Column 404 may represent a reference to another table, which may stores strings for device data and interface data. Referring back to FIG. 2A, this may allow for the storage of a single integer to represent device and interface data instead of actual strings like in columns 206 and 208.

Figure 5:
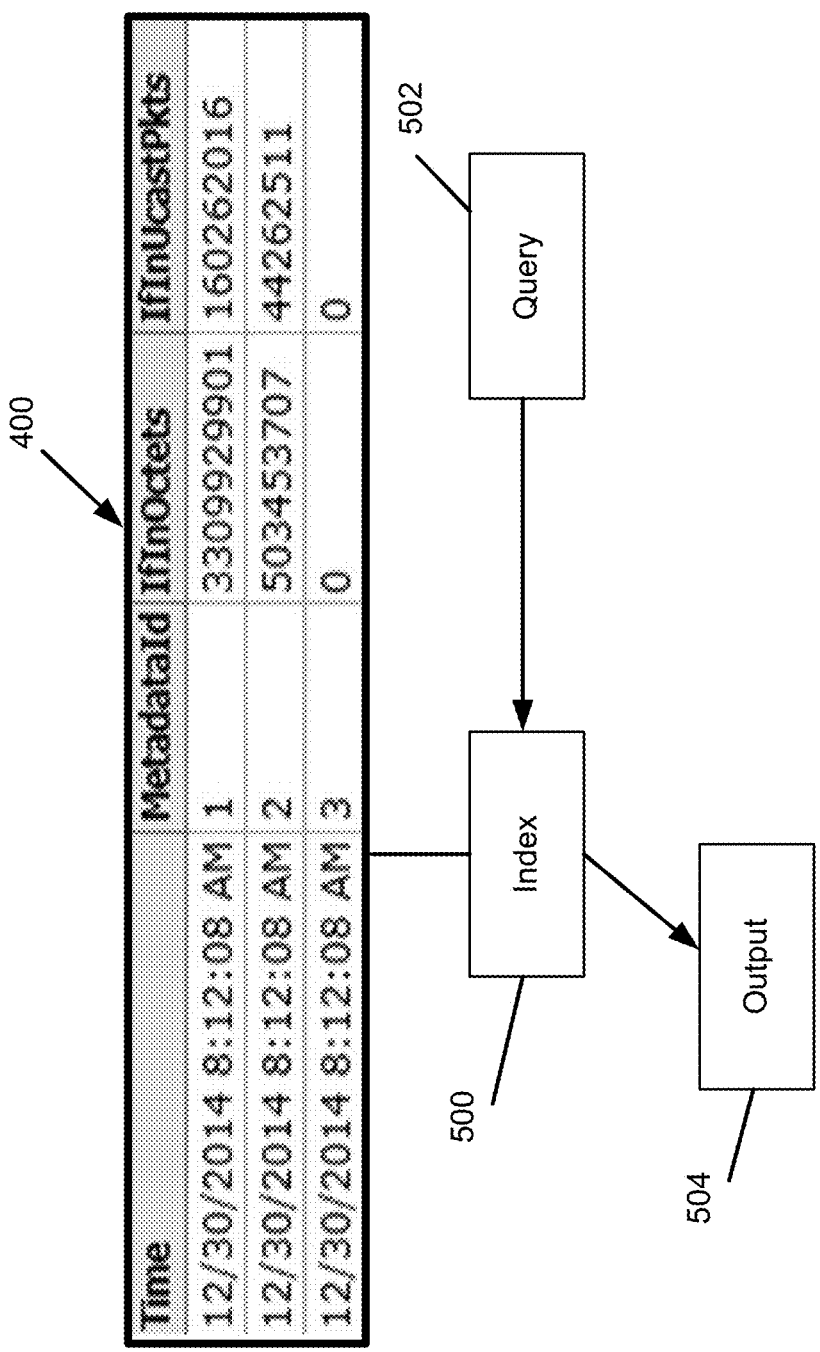
FIG. 5 illustrates a block diagram of querying data stored according to a second schema according to an example embodiment.

FIG. 5 illustrates querying of an example data 400 generated by the second schema. The created index 500 may be used for faster searching. Based on a query 502 to determine performance data for an instance, the data 400 is searched and an output 504 is generated. The index 500 enables faster query response. Moreover, the query 502 based on the index 500 has a simpler structure compared to a query directly on the data 400 or, for that matter, data 200 in FIG. 2.

Figure 6:
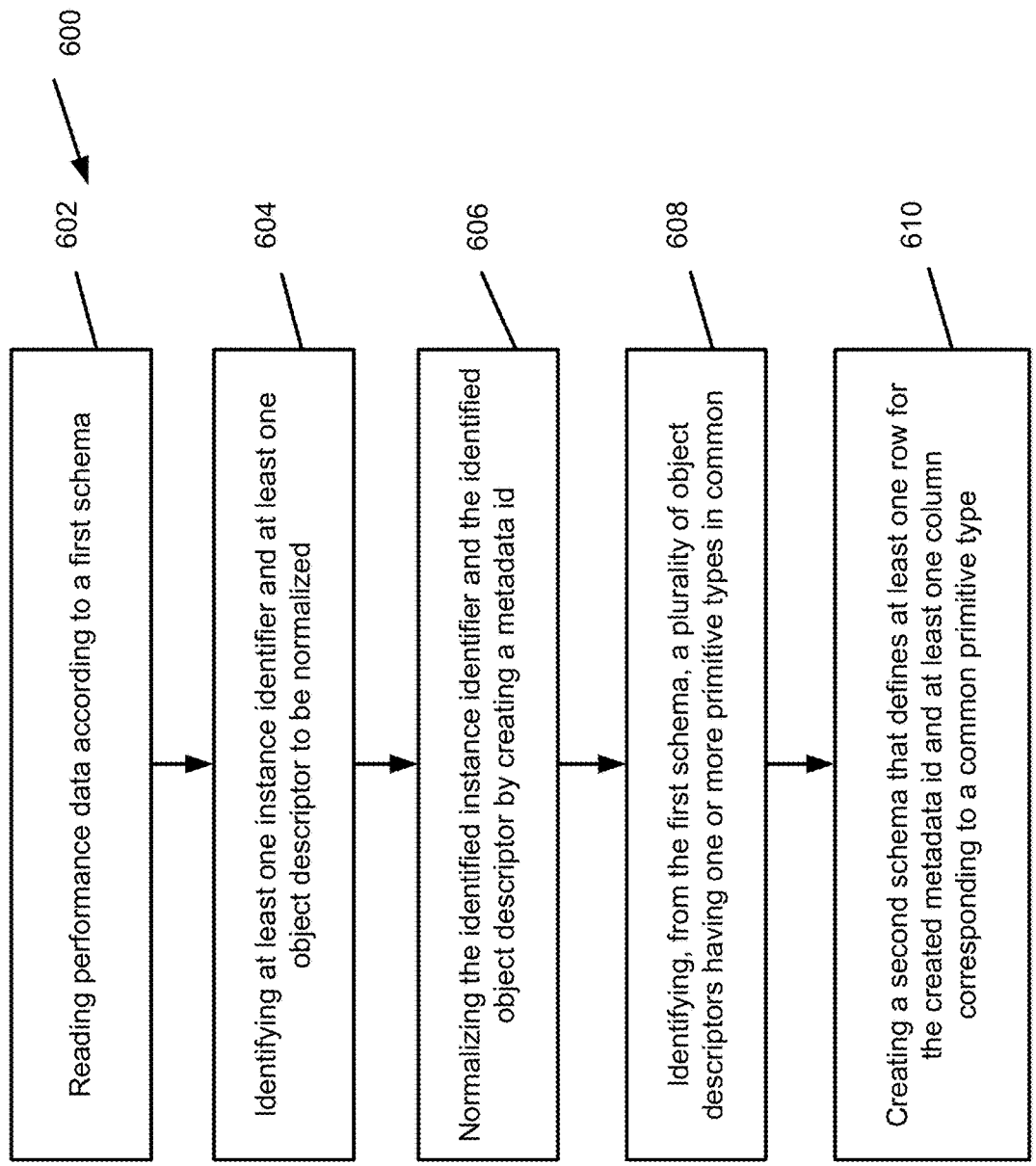
FIG. 6 illustrates a method of performance data management according to an example embodiment.

FIG. 6 illustrates flowchart of a method 600 of performance data management according to an example embodiment. The method 600 is described by referring to components in FIG. 1. However, One of ordinary skill in the art will appreciate that method 600 may be accomplished by other hardware and/or software components without departing from the scope of the disclosure. At 602, performance data 110 generated according to a first schema is read. In an example embodiment, the first schema may be read by schema generator 102. The first schema includes fields such as, for example, a time stamp, an instance identifier, an object descriptor, a primitive type, and a primitive value. At 604, at least one instance identifier and at least one object descriptor are identified by the normalizer 104. As explained earlier, the instance identifier may be a device identifier or a logical instance identifier and an object descriptor may be an identifier to describe parameters such as, for example, interface data, central processing unit (CPU) data, Link State Path (LSP) data, Virtual LAN (VLAN) data, Virtual Channel (VC) data, or Virtual Path (VP) data. At 606, the identified instance identifier and the identified object descriptor are normalized by the normalizer 104 by creating a metadata id. The created metadata id corresponds to the identified instance identifier and the identified object descriptor.

At 608, a plurality of object descriptors having primitive types in common are identified from the first schema by the schema generator 102. For example, object descriptors "Io" and "eth0" have a common primitive type "IfInOctets" (as shown in FIG. 2A). Such object descriptors are identified. At 610, the schema generator 102 creates a second schema based on the common primitive types. The second schema defines at least one row for the created metadata id and at least one column corresponding to a common primitive type. For example, referring to FIG. 4, the rows correspond to respective metadata identifiers and the primitive type columns 406 and 408 correspond to respective common primitive types "IfInOctets" and "IfInUcastPkts."

Figure 7:
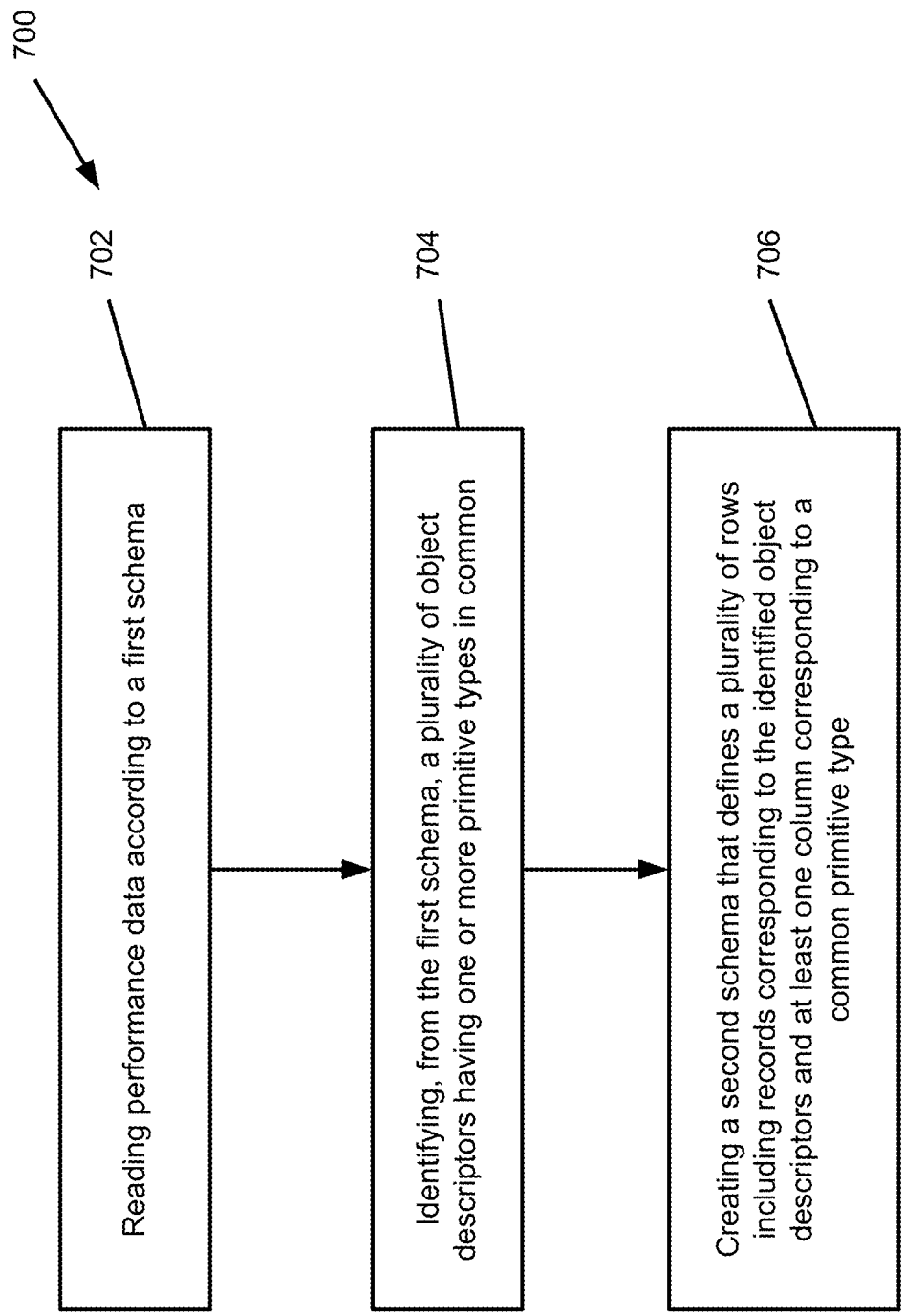
FIG. 7 illustrates a method of performance data management according to another example embodiment.

FIG. 7 illustrates a method 700 of performance data management according to another embodiment. The method 700 is described by referring to components in FIG. 1. However, one of ordinary skill in the art will appreciate that method 600 may be accomplished by other hardware and/or software components without departing from the scope of the disclosure. At 702, performance data 110 generated according to a first schema is read by the schema generator 102. At 704, from the first schema, a plurality of object descriptors having common primitive types are identified by the schema generator 102. For example, object descriptors "Io", "eth0", and "eth1" have two common primitive type "IfInOctets" and "IfInUcastPkts" (as shown in FIG. 2A). At 706, a second schema is created by the schema generator 102. The second schema defines a plurality of rows, where each of the rows includes a record corresponding to the identified object descriptors. The second schema also defines at least one column corresponding to a primitive type in common with the plurality of identified object descriptors. For example, referring to FIG. 3A, each row includes a record corresponding to the identified object descriptors "Io", "eth0", and "eth1". A first row includes a record corresponding to the object descriptor "Io", a second row includes a record corresponding to the object descriptor "eth0", a third row includes a record corresponding to the object descriptor "eth1". The primitive type columns 310 and 312 correspond to respective common primitive types "IfInOctets" and "IfInUcastPkts."

Figure 8:
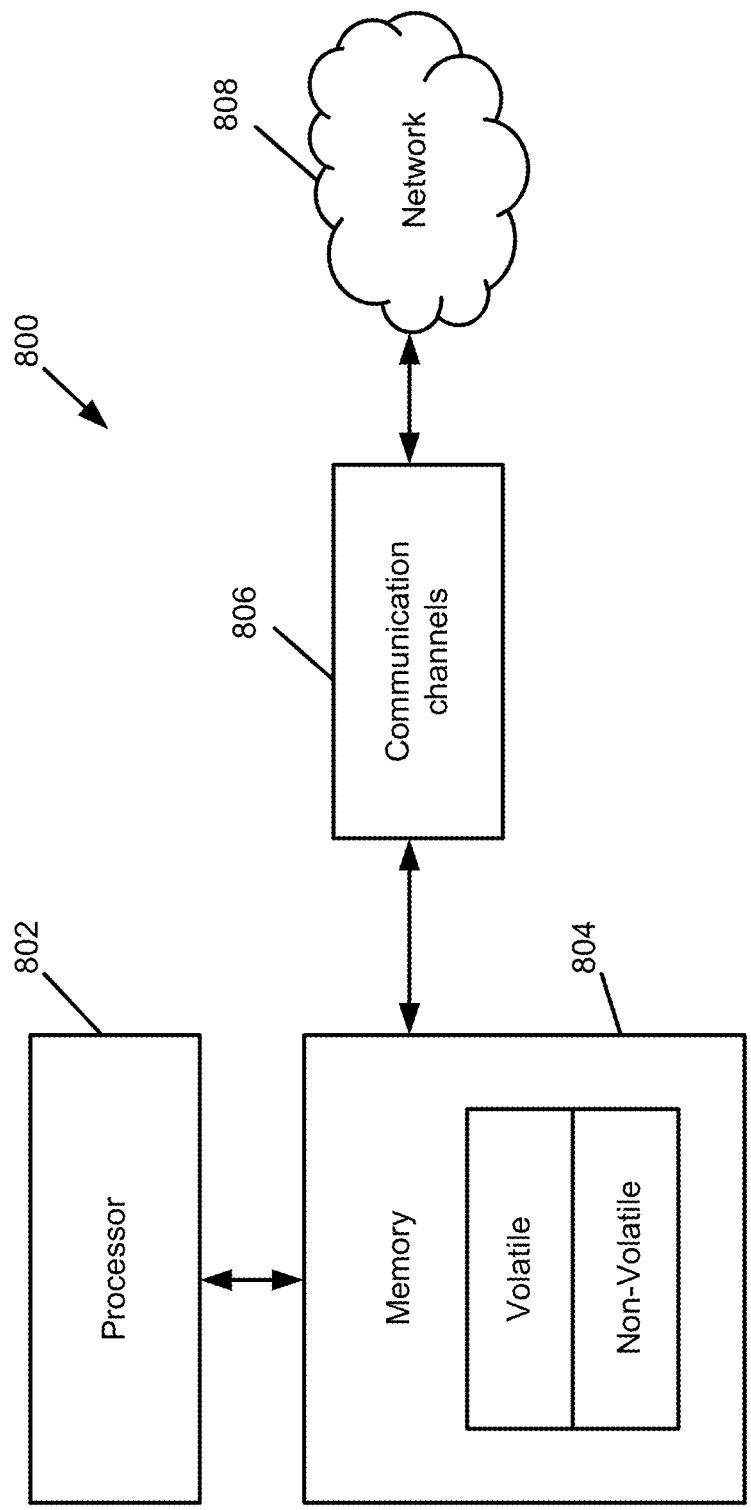
FIG. 8 illustrates a computer system according to an example embodiment.

FIG. 8 illustrates a computer system 800 according to an embodiment. Embodiments described herein may comprise or utilize the computer 800. Computer system 800 typically includes at least one processing unit 802 and memory 804. The memory 804 may be physical system memory, which may be volatile, non-volatile, or some combination of the two. The term "memory" may also be used herein to refer to non-volatile mass storage such as physical storage media. If the computer system 800 is distributed, the processing, memory and/or storage capability may be distributed as well. As used herein, the term "module" or "component" can refer to software objects or routines that execute on the computer system 800. The different components, modules, engines, and services described herein may be implemented as objects or processes that execute on the computer system 800 (e.g., as separate threads).

In the present disclosure, embodiments are described with reference to acts that are performed by one or more computing systems, such as the computer system 800. If such acts are implemented in software, one or more processors of the associated computing system that performs the acts direct the operation of the computing system in response to having executed computer-executable instructions. Within the context of the computer system 800, computer-executable instructions may be stored in the memory 804. Computer system 800 may also contain communication channels 806 that allow the computer system 800 to communicate with other message processors over a network 808.

Embodiments described herein also include physical and other computer-readable media for carrying or storing computer-executable instructions and/or data structures. Such computer-readable media can be any available media that can be accessed by a computer system. Computer-readable media that store computer-executable instructions are physical storage media. Computer-readable media that carry computer-executable instructions are transmission media.

Computer storage media includes recordable-type storage media, such as RAM, ROM, EEPROM, CD-ROM or other optical disk storage, magnetic disk storage or other magnetic storage devices, or any other medium that can be used to store desired program code means in the form of computer-executable instructions or data structures and which can be accessed by a computer system.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network (e.g., the network 808) and/or data links which can be used to carry or desired program code means in the form of computer-executable instructions or data structures and which can be accessed by a computing system. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also utilize transmission media.

Computer-executable instructions comprise, for example, instructions and data which, when executed at a processor, cause a computer or a processing device to perform a certain function or group of functions. The computer executable instructions may be, for example, binaries, intermediate format instructions such as assembly language, or even source code. Although the subject matter is described herein using language specific to structural features and/or methodological acts, it is to be understood that the subject matter defined in the appended claims is not necessarily limited to the described features or acts described herein. Rather, the features and acts described herein are disclosed as example forms of implementing the claims.

Those skilled in the art will appreciate that the present disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The present disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Although the processes illustrated and described herein include series of steps, it will be appreciated that the different embodiments of the present disclosure are not limited by the illustrated ordering of steps, as some steps may occur in different orders, some concurrently with other steps apart from that shown and described herein. In addition, not all illustrated steps may be required to implement a methodology in accordance with the present disclosure. Moreover, it will be appreciated that the processes may be implemented in association with the apparatus and systems illustrated and described herein as well as in association with other systems not illustrated.

Example embodiments are described above, and those skilled in the art will be able to make various modifications to the described embodiments and examples without departing from the scope of the embodiments and examples.

What is claimed is:

1. A computer-implemented method of performance data management, comprising:
reading performance data according to a first schema, wherein the first schema comprises an instance identifier field, an object descriptor field, a primitive type field, and a primitive value field;
identifying at least one instance identifier from the instance identifier field and at least one object descriptor from the object descriptor field to be normalized;
normalizing the identified instance identifier and the identified object descriptor by creating a metadata identifier to correspond to the identified instance identifier and the identified object descriptor;

identifying, from the object descriptor field in the first schema, object descriptors having a primitive type in common; and creating a second schema, wherein the second schema defines at least one row corresponding to the created metadata identifier and at least one column corresponding to the common primitive type.

2. The method of claim 1, wherein the identified instance identifier and the identified object descriptor are normalized when data in their respective fields does not change over a plurality of polling intervals.

3. The method of claim 1, further comprising:
polling at least one of one or more physical instances and one or more logical instances in a network at predetermined polling intervals; and
storing a primitive value received for the common primitive type from the polled instance in a corresponding column for the common primitive type.

4. The method of claim 1, further comprising:
creating an index for data of the second schema by excluding the primitive values, wherein the index corresponds to an instance.

5. The method of claim 4, further comprising:
querying the index to determine performance data for the instance.

6. The method of claim 1, wherein the instance identifier identifies a physical instance in a network.

7. The method of claim 1, wherein the instance identifier identifies a logical instance in a network.

8. The method of claim 1, wherein the object descriptor describes at least one of interface data, central processing unit (CPU) data, Link State Path (LSP) data, Virtual LAN (VLAN) data, Virtual Channel (VC) data, or Virtual Path (VP) data.

9. A computer-readable storage medium including instructions that, when executed by a processor, cause the processor to:
read performance data according to a first schema, wherein the first schema comprises an instance identifier field, an object descriptor field, a primitive type field, and a primitive value field, wherein the object descriptor field contains object descriptors, the primitive type field contains a primitive type for each of the object descriptors in the object descriptor field, and the primitive value field contains a primitive value for each of the primitive types in the primitive type field;
identify object descriptors in the objector descriptor field that have a same primitive type in the primitive type field;
identify the primitive values in the primitive value field that correspond to the same primitive type; and
creating a second schema, wherein the second schema includes:
a column for the same primitive type, the column containing the identified primitive values in the primitive value field in the first schema that correspond to the same primitive type.

10. The computer-readable medium of claim 9 further including instructions that, when executed by the processor, cause the processor to:
identify at least one instance identifier from the instance identifier field and at least one object descriptor from the object descriptor field to be normalized;
normalize the identified instance identifier and the identified object descriptor by creating a metadata identifier to correspond to the identified instance identifier and the identified object descriptor; and
replace the identified object descriptors in the second schema with the corresponding metadata identifier.

11. The computer-readable medium of claim 10, further including instructions that, when executed by the processor, cause the processor to create an index for data of the second schema by excluding primitive values, wherein the index corresponds to an instance.

12. The computer-readable medium of claim 9, wherein the object descriptor describes at least one of interface data, central processing unit (CPU) data, Link State Path (LSP) data, Virtual LAN (VLAN) data, Virtual Channel (VC) data, or Virtual Path (VP) data.

13. A system for managing performance data measured for a plurality of computing devices, the system comprising:
at least one processor;
a schema generator connected to the plurality of computing devices, wherein the schema generator is executed by the at least one processor to:
read performance data of the plurality of computing devices according to a first schema, wherein the first schema comprises an instance identifier field, an object descriptor field, a counter type field, and a counter value field;
identify at least one instance identifier from the instance identifier field and at least one object descriptor from the object descriptor field to be normalized;
normalize the identified instance identifier and the identified object descriptor by creating a metadata identifier to correspond to the identified instance identifier and the identified object descriptor;
identify, from the object descriptor field in the first schema, object descriptors having a counter type in common; and
create a second schema, wherein the second schema defines at least one row corresponding to the created metadata identifier and at least one column corresponding to the common counter type.

14. The system of claim 13 further including a data storage to store data in accordance with the second schema.

15. The system of claim 13, further comprising a normalizer executed by the at least one processor to normalize the identified instance identifier and the identified object descriptor when data in their respective fields does not change over a plurality of polling intervals.

16. The system of claim 13, further comprising an index generator executed by the at least one processor to create an index for data of the second schema by excluding the counter values wherein the index corresponds to an instance.

17. The system of claim 16, wherein the at least one processor executes a query on the index to determine performance data for the instance.

18. The system of claim 13, wherein the instance identifier identifies a physical instance in a network.

19. The system of claim 13, wherein the instance identifier identifies a logical instance in a network.

20. The system of claim 13, wherein the object descriptor describes at least one of interface data, central processing unit (CPU) data, Link State Path (LSP) data, Virtual LAN (VLAN) data, Virtual Channel (VC) data, or Virtual Path (VP) data.

* * * * *